(12) United States Patent
Popp

(10) Patent No.: US 7,433,556 B1
(45) Date of Patent: Oct. 7, 2008

(54) OPTICAL ROTARY JOINT

(75) Inventor: Gregor Popp, Munich (DE)

(73) Assignee: Schleifring und Apparatebau GmbH, Fuerstenfeldbruck (DE)

( * ) Notice: Subject to any disclaimer, the term of this patent is extended or adjusted under 35 U.S.C. 154(b) by 0 days.

(21) Appl. No.: 11/766,361

(22) Filed: Jun. 21, 2007

(51) Int. Cl.
*G02B 6/26* (2006.01)
*G02B 6/42* (2006.01)
*G02B 6/32* (2006.01)

(52) U.S. Cl. .............................. 385/26; 385/33; 385/36; 385/140

(58) Field of Classification Search .................... 385/25, 385/26, 33, 34, 36, 140
See application file for complete search history.

(56) References Cited

U.S. PATENT DOCUMENTS

| | | | | |
|---|---|---|---|---|
| 4,109,998 | A * | 8/1978 | Iverson | 385/26 |
| 5,568,578 | A | 10/1996 | Ames | |
| 6,782,160 | B2 * | 8/2004 | Townsend et al. | 385/25 |
| 7,142,747 | B2 * | 11/2006 | Oosterhuis et al. | 385/26 |
| 7,298,538 | B2 * | 11/2007 | Guynn et al. | 359/212 |
| 7,373,041 | B2 * | 5/2008 | Popp | 385/26 |
| 2003/0099454 | A1 * | 5/2003 | Chang | 385/140 |
| 2007/0053632 | A1 * | 3/2007 | Popp | 385/26 |

FOREIGN PATENT DOCUMENTS

EP 1476969 7/2005
JP 02141708 A * 5/1990

* cited by examiner

*Primary Examiner*—Sung Pak
*Assistant Examiner*—Daniel Petkovsek
(74) *Attorney, Agent, or Firm*—Kevin L. Daffer; Daffer McDaniel, LLP

(57) ABSTRACT

A device for transmitting optical signals comprises two collimator units, supported to be rotatable relative to each other about a rotation axis and one derotating optical element. A first beam splitter receives input signals and splits them into at least two signals, so that they are transferred by at least two optical channels over the collimator units and the derotating optical element. After passing the second collimator unit, the signals are combined by a second beam splitter to a single signal, resulting in largely reduced variations of attenuation during rotation.

9 Claims, 4 Drawing Sheets

OPTICAL ROTARY JOINT

BACKGROUND OF THE INVENTION

1. Field of the Invention

The present invention relates to a device for transmitting optical signals between units that are rotatable relative to each other. This is for simultaneously transmitting a plurality of optical signals along a plurality of channels. Preferably analog signals are transferred over an inventive rotary joint.

2. Description of the Related Art

Various transmission systems are known for transmitting digital optical signals between units that are rotatable relative to each other. These are referred to as rotary coupling or rotary joint.

An optical rotary joint for a plurality of channels, comprising a Dove prism, is disclosed in U.S. Pat. No. 5,568,578. Light is transferred from a first collimator to a second collimator, wherein a derotating prism is in the optical path between the collimators, the prism rotating with half the speed or angular displacement between the collimators. Due to mechanical and optical tolerances the attenuation changes with rotation. It is dependent of the angular position between the rotating and the stationary part of the rotary joint. Such a varying attenuation causes changing in the optical signal level. Accordingly analog signals, carrying the information in the amplitude, can hardly be transferred. This does not matter for digital signals, where only zero and one states have to be transferred.

EP 1476969 discloses a rotating data transmission device in which the light is transmitted by multiple reflections in mirror-coated trench. The attenuation of the incident light is varying significantly according to the angular position between the rotating and the stationary part.

SUMMARY OF THE INVENTION

It is the object of the present invention to further develop an optical rotary joint for transmitting optical signals in such a manner that variations of attenuation of the rotary joint during rotation is minimized. Another object is to make the rotary joint suitable for transmission of analog optical signals, carrying their information in the signal amplitude or signal level.

In accordance with the invention, these objects are achieved with an optical rotary joint, comprising: a first collimator unit; a second collimator unit supported to be rotatable relative to the first collimator unit about a rotation axis; at least one derotating optical element made of an optically transparent medium and disposed between the first collimator unit and the second collimator unit for transmitting light beams between the first collimator unit to the collimator coupling unit or vice versa. Furthermore a first beam splitter receives input signals and splits them into at least two signals, so that they are transferred by at least two optical channels over the collimator units and the derotating optical element. After passing the second collimator unit, the signals are combined by a second beam splitter to a single signal, resulting in largely reduced variations of attenuation during rotation.

BRIEF DESCRIPTION OF THE DRAWINGS

In the following the invention will be described by way of example, without limitation of the general inventive concept, on examples of embodiment and with reference to the drawings.

DETAILED DESCRIPTION OF PREFERRED EMBODIMENTS

Figure 1:
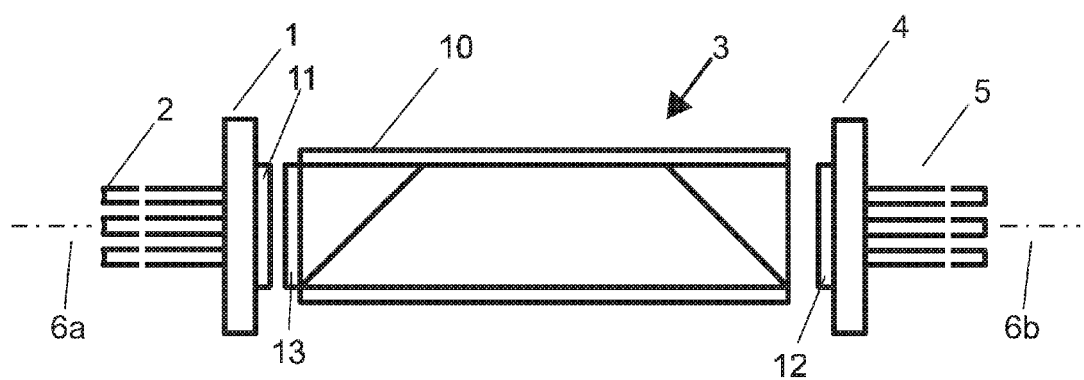
FIG. 1 schematically shows in a general form an arrangement in accordance with the invention.

The optical rotary joint according to the invention comprises at least two collimator units disposed to be rotatable relative to each other about an axis. In an advantageous manner, these collimator units comprise collimators for beam-shaping the light to be transmitted. However, optionally they may also comprise light sources such as lasers, light sinks, such as photodiodes, or other light guiding elements such as glass fibers. Each collimator has an "external side" for connecting at least one of a light source or a light sink by means of first light waveguides 2 or second light waveguides 5. The other side, oriented towards the derotating element is further referred as "internal side." An optical path for transmitting light is present between at least one first collimator unit and at least one second collimator unit disposed to be rotatable relative to the first. Such an optical path is also referred to as channel. Located within this optical path is at least one derotating element for imaging light sent out from a first collimator unit onto a second collimator unit, and also in the opposite direction, independently from the rotational movement between the two coupling units. A derotating element of this kind may be, for example, a Dove prism or an Abbe-Koenig prism. In the following, a derotating element of a general configuration will also be referred to by using the collective term "prism."

Here the term "collimator" denotes a beam guiding or beam shaping element in the widest sense. The purpose of a collimator of this kind consists of converting the light guided in a light waveguide, for example a single mode fiber or even a multimode fiber, to a beam path that can be passed through the derotating element. This corresponds to a beam path in free space or in an optical medium, such as glass or oil, for example. Similarly, a conversion in the opposite direction, i.e. from a beam path in the rotary joint to a light waveguide, may be effected by means of a collimator. Of course, conversions in both directions within a collimator are conceivable. Signals preferably from single mode light waveguides, but also other optical signals, in particular from other light waveguides, further referred as optical fibers, or combinations of different signals may be transmitted using the rotary joints in accordance with the invention.

The arrangements in accordance with the invention may be operated basically in both directions, i.e., from the first collimator unit to the second collimator unit or vice versa, but also bi-directionally. In the following, reference will be made also to light entry faces, coupling-in light etc. to simplify the illustration. It is evident that for a reversed direction of transmission, these terms will relate to the corresponding light exit faces.

Prisms or derotating optical elements in accordance with the invention consist of optically transparent material, preferably glass. However, any other material that is suitable in accordance with the wavelength to be transmitted, such as for example silicon or germanium, may be used.

According to a first aspect of the invention, a first beam splitter is connected to the external sides of at least two first collimators of the first collimator unit and a second beam splitter is connected to the external sides of at least two second collimators of a second collimator unit. Further reference is made to beam splitters having exactly one first side and a plurality of second sides. If a signal is coupled into the first side, the splitter divides it into a plurality of signals at the second side. The ratios of signal levels at the second side compared to the first side, further referred as splitting ratios, are given by the design of the beam splitter. It is obvious, that the total power at the second side can not exceed the power at the first side. A splitter may also receive signals at the second side, which are combined together and fed to the first side. For example, light is transferred, preferably by an optical fiber from a light source into the first beam splitter. There it is divided into at least two light paths feeding light into at least two first collimators. Preferably the beam splitter distributes the optical input power evenly into the light paths. For the case of two light paths the beam splitter is preferably a 3 dB splitter resulting in 3 dB attenuated signals in both optical paths on its second side compared to the first side. Therefore each path has half of the input power before the beam splitter. In case of four light paths a 6 dB beam splitter is preferred, dividing the input light into four equal paths, each having one fourth of the input power on its second side compared to the first side. Light from the first collimators is transferred over the derotating optical element into corresponding second collimators of these same light path. From there it is transferred to the second beam splitter, joining the light paths into a single light path.

What has been described above for transferring light from first collimators to second collimators is also applicable for transferring light into the opposite direction. Of course, the system works in both directions only if the optical path is reciprocal and, therefore, the collimators are not direction sensitive. For the case, direction sensitive splitters are used, this must be considered for selecting the direction of signal transmission. Herein an optical path or channel comprises one first collimator of the first collimator unit and a corresponding second collimator of the second collimator unit. Herein the term "corresponding" or these refers to collimators of the same optical path, which are optically connected together via the derotating optical element. In general, this invention is applicable to any type of optical rotary joints provided they have at least two channels.

A further improvement can be achieved by using more than two collimators on each side. A higher collimator number may smoothly equalize any position dependent changes of attenuation. A preferred number of collimators are 2, 3, or 4.

In a preferred embodiment of the invention the first and second collimators are selected for minimum changes in attenuation. Assuming the collimators are evenly arranged around a 360° circumference of the rotary joint (see FIG. 3), and the attenuation may be minimal at a specific position, now referred as the 0° position, and furthermore the attenuation may have a maximum at the opposite side, at 180°, preferably a first collimator at the 0° position is used in conjunction with another first collimator at the 180° position. This results in a relatively constant average attenuation.

In another embodiment of the invention, the first beam splitter 41 receiving the input signal at its first side is configured to split was input signal into a plurality of signals at its second side, wherein the splitting ratio for each light path is adjusted to obtain a minimum of variations in attenuation of the whole device.

In a further embodiment of the invention, the splitting ratio of beam splitter is adjustable.

In another embodiment of the invention, the number of channels may be increased by using a wavelength multiplexing system. Furthermore the beam splitters may be wavelength-selective and may therefore split the signals into a plurality of optical paths to minimize the variations in attenuation of the device for each wavelength.

In another aspect of the invention, at least one optical attenuator is provided in the optical path between the first collimator unit, and the second collimator unit. At least one such attenuator may be fixedly attached to the first collimator unit, to the second collimator unit, to the derotating element or to a gear or an electronic drive system, rotating the at least one optical attenuator in dependency of the angular position between the first collimator unit and the second collimator unit. Preferably at least one such attenuator has attenuation characteristics dependent on the angular position. Furthermore the attenuation may be dependent of the radial position. Also a combination of both is possible. Preferably at least one attenuator has a circular shape. An attenuator's attenuating characteristics may be based on previous attenuation measurements or attenuation calculations. The at least one optical attenuator may be attached fixedly or connected in such a way that it rotates with the same angular position or such a rotational speed as the first collimator unit, the second collimator unit, or the derotating element.

In a preferred embodiment of the invention, at least one optical attenuator is provided rotating at the same angular speed as the first collimator. Therefore it is preferably coupled to the first collimator. Also the attenuator may be coupled to the second collimator. It is arranged within the optical path between the first collimator unit and the second collimator unit. The attenuator preferably has position dependent attenuating characteristics, compensating for rotation angle dependent attenuation deviations. An attenuator for the example above may have a minimum attenuation in the 180° position and a maximum attenuation for the 0° position.

In another preferred embodiment of the invention, at least one optical attenuator is provided, rotating at the same angular speed or displacement as the derotating optical element. It is preferably coupled to this derotating optical element. Therefore the attenuator may compensate for variations in the attenuation, which are caused by deviations or on symmetries of the prism and its mounting. As the prism moves with half the rotational speed, deviations in attenuation caused by the prism and its mounting have a periodicity or repetition rate every second revolution of the collimators.

In most applications, there are mechanical tolerances in the collimators and in the prism or it's mounting. Therefore, the best results can be achieved by inserting a first attenuator and/or a second attenuator, being coupled to one of the collimators and a third attenuator, which is coupled to the prism or its mounting.

In another embodiment of the invention, an attenuator is coupled to a gear being driven by the rotation of the collimators against each other. The attenuator can thus be rotated by any speed, being adapted to a specific variation of attenuation. Preferably the transmission ratio of the gear is a multiple or a fraction of N of the rotation speed between the collimators, where N is an integer. Instead of a gear, an electric motor, preferably a stepper or another drive, may be used which may be controlled by an electronic controller, preferably comprising a microcontroller.

According to a further aspect of the invention, at least one optical attenuator is connected to at least one external side of at least one collimator. Preferably one attenuator is connected to the external side of either the first collimator unit or the second collimator unit. The at least one collimator is controlled by an electronic controller setting the attenuation of the at least one collimator. The attenuation may be adjusted dependent on the angular position between the first collimator unit and the second collimator unit. For this purpose a position or angle decoder is provided to signal said angular position to the electronic controller. Alternatively, an attenuation or a signal amplitude value may be signaled to the controller. An attenuation value may be measured by using a different signal path. An amplitude value may be measured by measuring the transmitted optical power by a power sensor, which may be connected by a power splitter. Furthermore there may be a control loop in the controller, which keeps the overall attenuation at a constant value.

FIG. 1 shows in a schematic form a cross-section of an arrangement according to the invention. The optical rotary joint according to the invention comprises a first collimator unit with a first collimator 1 for coupling-on first light waveguides 2, and also a second collimator unit with a second collimator 4 for coupling-on the second light waveguides 5. The second collimator 4 is supported to be rotatable relative to the first collimator 1 about the rotation axis 6a, 6b. For better illustration, the rotation axis 6 has here been indicated by the two line segments 6a and 6b, and has not been drawn to pass through the entire rotary joint. A derotating element 3 is located in the beam path between a first collimator 1 and a second collimator 4 to compensate the rotary movement. In this example the derotating element is a Dove prism. Light entering the prism is deflected by refraction in the direction towards the longer side, where it is deflected back into the prism by total reflection, and deflected by a repeated refraction in a direction parallel to the rotation axis of the prism. Thus, the derotated beams once again extend in parallel to the original beams. Furthermore, a first optical attenuator 11 attached to the first collimator unit 1, a second optical attenuator 12 attached to the second collimator unit 4, and a third optical attenuator 13 attached to a prism housing 10, are shown. The prism housing holds the derotating element, like a dove prism. The prism housing itself is not essential for the invention. It is shown here only four illustrative purposes. According to the invention at least one of these optical attenuators is necessary. Of course, several of these attenuators may be provided. When at least one attenuator, it is preferred being attached to at least one of the collimator units and a further attenuator being attached to at least one side of the prism are provided.

Figure 2:
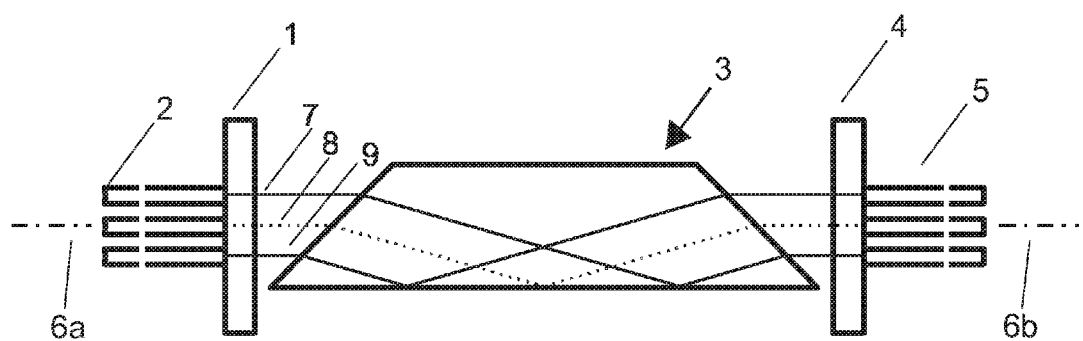
FIG. 2 schematically shows a rotary joint according to prior art.

FIG. 2 shows a rotary joint as it is known from prior art. The beam path is illustrated by the three optical paths 7, 8, 9.

Figure 3:
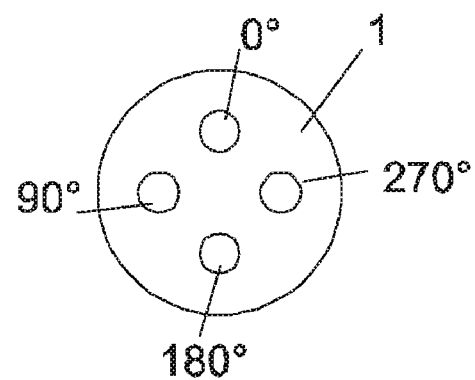
FIG. 3 schematically shows the prism side view of the first collimator.

FIG. 3 shows the prism side view of the first collimator unit 1, further showing the angular positions 0° on the top, 270° at the right side, 180° at the bottom and 90° at the left side.

Figure 4:
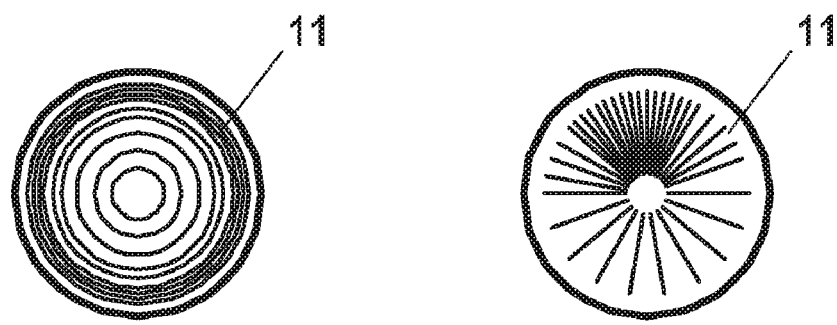
FIG. 4 shows simplified front views of two different embodiments of optical attenuators.

FIG. 4 shows simplified front views of two different embodiments of optical attenuator 11. The other attenuators may look similar. The attenuator has locally varying attenuation. The line density should symbolize the distribution of dark (attenuating) material in the attenuator body. The left attenuator has low attenuation at the center with increasing attenuation corresponding to increasing darkness to the outside. This attenuator may compensate for radius dependent errors, giving a higher attenuation to collimators at the outside compared to collimators close to the center. The right attenuator has the lowest attenuation at the center, higher attenuation at the top and lower attenuation at the bottom. This attenuator may compensate for angle dependent error. Of course, both types of attenuators may be combined.

Figure 5:
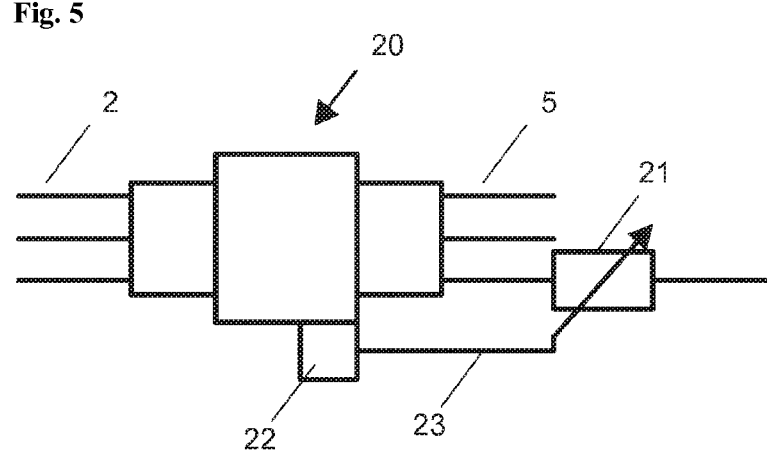
FIG. 5 shows another embodiment of the invention comprising a controllable attenuator.

FIG. 5 shows another embodiment of the invention; there an external controllable attenuator 21 is provided. This attenuator is controlled by control signal 23 supplied by angle encoder and controller 22. Angle encoder and controller 22 generates a position dependent signal which controls the attenuator 21 in such a way, that the output signal after the attenuator has a constant, position independent attenuation. Therefore, if the attenuation of the optical path inside the rotary joint 20 is low, the attenuator 21 has to add some higher attenuation. Otherwise, if the attenuation of the optical path inside rotary joint 20 is high, the attenuator 21 has to add a lower attenuation. The controllable attenuator 21 may alternatively be inserted anywhere in the optical path in the rotary joint 20, or on the other side of the Rotary joint 20. The angle dependent attenuation values preferably have been pre-calculated or measured during manufacturing or any calibration procedure and are preferably stored in a table, a memory, or a microcontroller.

Figure 6:
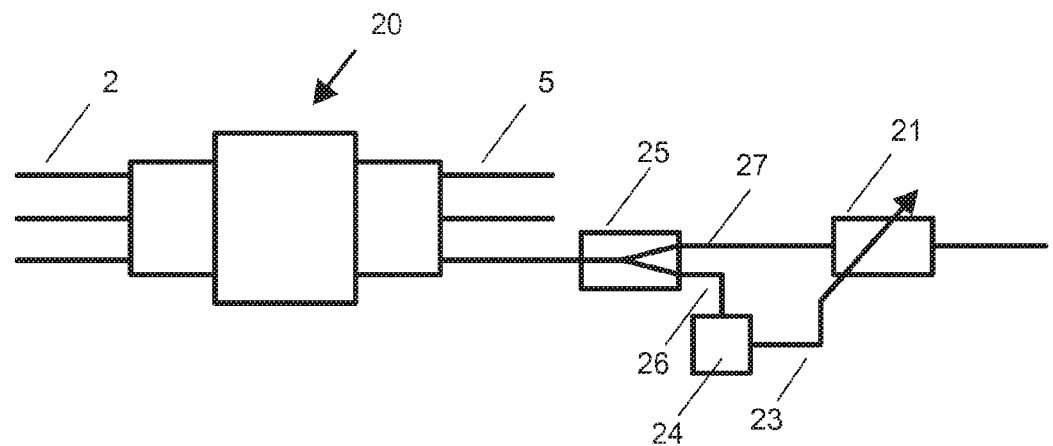
FIG. 6 shows another embodiment of the invention comprising a controllable attenuator together with a power control circuit.

FIG. 6 shows a further embodiment of the invention. An optical signal entering the rotary joint 20 through one of the first light waveguides 2 and leaving it through one of the second light waveguides 5, will pass through a beam splitter 25. The beam splitter 25 couples a preferably small part of the optical power into the first output signal 26, which is fed to the power meter and controller 24. This small part of the optical power is preferably 10%, or below, of the total optical power. The rest of the power is coupled via the second output signal 27 to a controllable attenuator 21. The power meter and controller 24 measures the output power and generates a control signal 23 to set the controllable attenuator 21 in such a way, that the average output power of the signal is constant. For simplification the embodiments of FIG. 5 FIG. 6 are shown externally from the rotary joint 20. Of course they may be integrated into the housing of the rotary joint.

Figure 7:
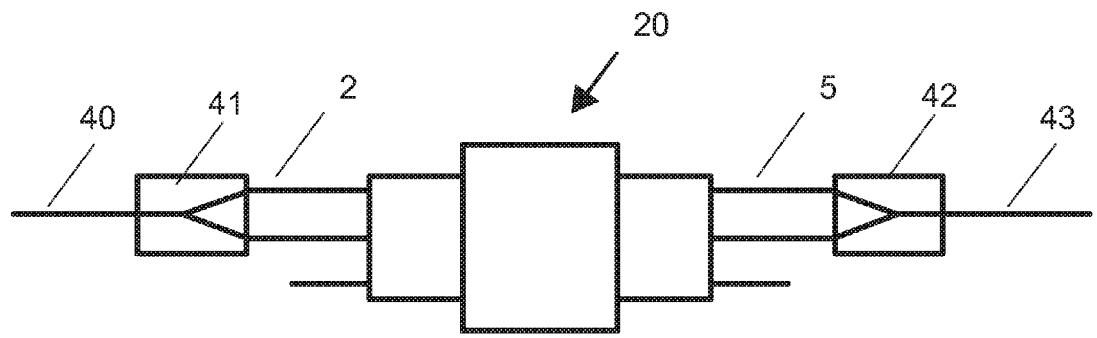
FIG. 7 shows a rotary joint combined with two beam splitters.

FIG. 7 shows a rotary joint combined with two beam splitters 41 and 42. An input signal arriving at input line 14 is split by the first beam splitter 41 into two, preferably equal signals, which are fed by two of the first light wave guides 2 into the rotary joint 20. The output signals leaving of the rotary joint via two of the second light wave guides 5 are combined by the inverted beam splitter 42 and fed to the output line 43.

Figure 8:
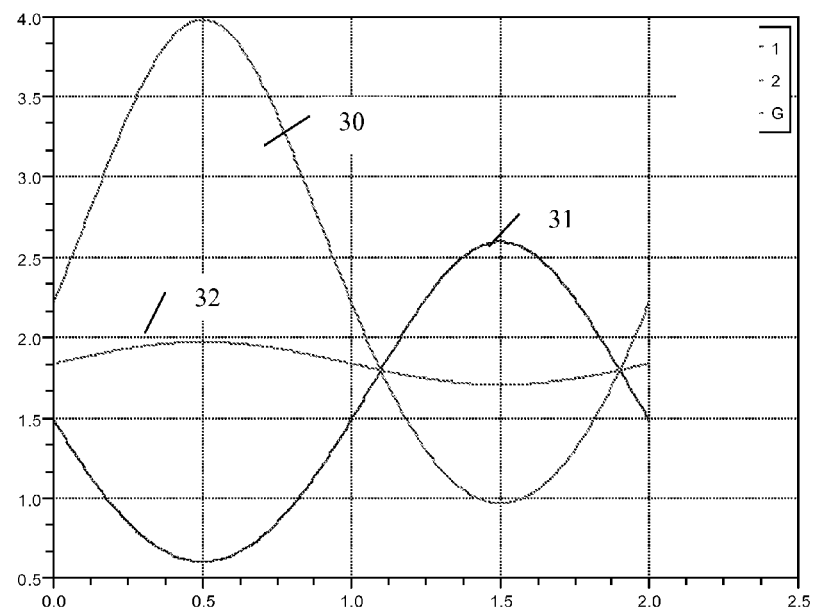
FIG. 8 shows typical attenuation curves.

FIG. 8 shows typical attenuation curves from an embodiment as shown in FIG. 7. The beam splitters 41 and 42 are 3 dB splitters, which means that an input signal is divided into two equal output signals at both outputs. Curve 30 shows the attenuation of a first optical path and curve 31 shows the attenuation of a different optical path through the rotary joint 20. Curve 33 shows the output signal in the light waveguide 43. Due to be combination of two opposite attenuation characteristics, the resulting attenuation characteristic has a very flat curve, offering very low deviations. The bottom axis from left to right it is a scale of the rotation angle. 1.0 is a full rotation and 2.0 corresponds to two full rotations. The left axis from bottom to top shows the attenuation in decibels (dB).

The invention claimed is:

1. A device for transmitting optical signals from an input light waveguide to an output light waveguide, comprising:
    a first collimator unit comprising at least two collimators;
    a second collimator unit comprising at least two collimators and supported to be rotatable relative to the first collimator unit about a rotation axis;

at least one derotating optical element made of a first optically transparent medium and disposed between the first collimator unit and the second collimator unit for transmitting light beams between the first collimator unit and the second collimator unit;

a first beam splitter/combiner receiving signals from said input light waveguide and splitting a received signal into at least two signals which are fed into two different collimators of said first collimator unit; and a second beam splitter/combiner receiving signals from at least two collimators of said second collimator unit, said collimators of the second collimator unit corresponding to said collimators of the first collimator unit, and said second beam splitter/combiner combining the signals received from the at least two collimators of the second collimator unit into one signal which is output through said output light waveguide.

2. The device according to claim 1, wherein the first collimator unit comprises two collimators, and the second collimator unit comprises two collimators.

3. The device according to claim 1, wherein groups of collimators of the first collimator unit and collimators of the second collimator unit are selected for a minimum attenuation variation.

4. The device according to claim 1, wherein said first beam splitter/combiner is a 3 dB splitter, thus splitting a received signal into two signals of a same power level.

5. The device according to claim 1, wherein said first beam splitter/combiner has adjustable splitting ratios, thus splitting a received signal into a plurality of signals, all signals having power levels optimized to obtain a minimum variation attenuation of the device.

6. The device according to claim 1, wherein a number of channels is increased by using a wavelength multiplexing system, and the first and second beam splitters/combiners are wavelength-selective and, therefore, split the signals into a plurality of optical paths to minimize variations in attenuation of the device for each wavelength.

7. A device for transmitting optical signals from an input light waveguide to an output light waveguide, comprising:

a first collimator unit comprising at least one collimator;

a second collimator unit comprising at least one collimator and supported to be capable of rotation relative to the first collimator unit about a rotation axis;

at least one derotating optical element made of a first optically transparent medium and disposed between the first collimator unit and the second collimator unit for transmitting light beams between the first collimator unit and the second collimator unit;

at least one controllable optical attenuator which is connected to external sides of either the first collimator unit or the second collimator unit;

said optical attenuator being controlled by a controller, and generating control signals in such a way that the controllable optical attenuator is set to values compensating for changes in attenuation in an optical path between said first collimator unit and said second collimator unit.

8. The device according to claim 7, wherein said controller receives signals from a position encoder or rotational speed encoder, encoding a rotational movement between first and second collimator units.

9. The device according to claim 7, wherein an optical power meter is connected via a beam splitter to at least one collimator unit to measure optical power of a signal passing through the at least one collimator unit, wherein the power meter signals measure optical power of the signal to the controller, and wherein the controller controls the controllable optical attenuator so that the optical power of the signal is kept at a constant level.

* * * * *